Figure 1:
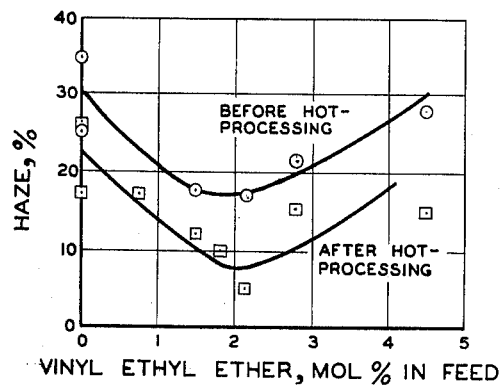
Figure 2:
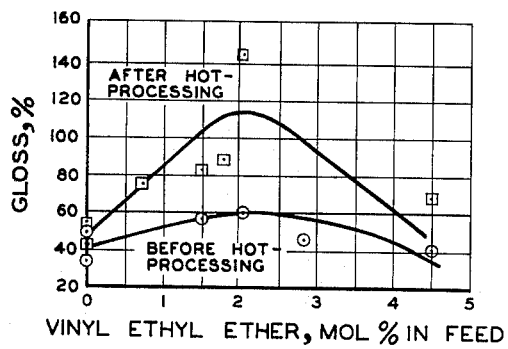
Figure 3:
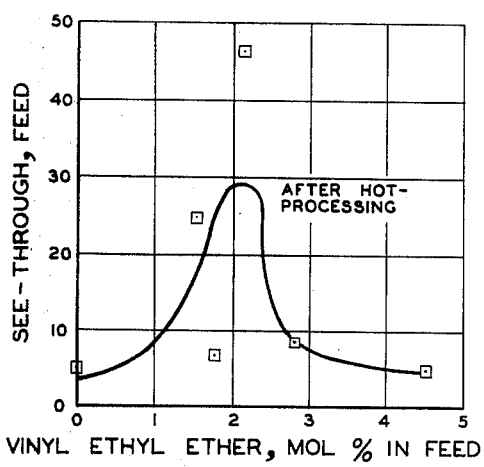

INVENTORS
WAYNE G. WHITE
BY RICHARD A. WALTHER

ATTORNEY

United States Patent Office 3,226,374
Patented Dec. 28, 1965

3,226,374
COPOLYMER OF ETHYLENE AND VINYL ALKYL ETHER
Wayne G. White, South Charleston, and Richard A. Walther, St. Albans, W. Va., assignors to Union Carbide Corporation, a corporation of New York
Filed June 15, 1960, Ser. No. 36,250
1 Claim. (Cl. 260—88.1)

This invention relates to copolymers of ethylene capable of producing films of improved optical properties. More particularly it is concerned with copolymers of ethylene with a vinyl alkyl ether.

It is known that vinyl alkyl ethers can be copolymerized with ethylene to produce a wide variety of polymers ranging from oils and waxes to solid telomeric products. However, the solid copolymers heretofore produced have not shown and advantages in properties over homopolymeric polyethylene.

It has now been found that ethylene/vinyl alkyl ether copolymers having improved optical properties, as well as showing improved stiffness, yield point and ultimate tensile strength, can be produced by the non-aqueous polymerization of the vinyl alkyl ether with ethylene. These improvements were found to prevail only when the vinyl alkyl ether concentration in the feed mixture is maintained within a very narrow and critical range. Failure to operate within this critical concentration range results in a copolymer which shows no improvements over polyethylene per se, or over the ethylene/vinyl alkyl ether copolymers heretofore known to the art. In addition to the above-stated advantages, the improved copolymers of this invention exhibit generally improved extrusion characteristics and lower film shrinkage as compared to regular polyethylene. The improved extrusion characteristics are manifested by fewer "blow holes" during extrusion, even where "fisheyes" occur. The effect of these improved properties is that a higher-quality film-grade copolymer is obtained.

As has been stated, the process is carried out in a non-aqueous system; and it can be conducted in a batchwise manner or in a continuous manner using, for example, a tubular reactor. The improved copolymers produced by the process of this invention have densities of from about 0.915 g./cc. to about 0.94 g./cc. at 23° C. as compared to densities up to about 0.92 g./cc. for the copolymers heretofore produced.

In accordance with this invention it has been found that ethylene/vinyl alkyl ether copolymers having the aforementioned desirable properties can be obtained by copolymerizing ethylene with a narrowly critical concentration of vinyl alkyl ether. The critical concentration of vinyl alkyl ether in the feed is from about 1 to about 3.5 moles and preferably from about 1.75 to about 2.5 moles per 100 moles of ethylene. The polymerization is carried out in the presence of a free radical type polymerization catalyst at pressures of from about 15,000 p.s.i. up to about 80,000 p.s.i., or higher; and at polymerization temperatures of from about 90° C. to about 350° C., preferably from about 160° C. to about 250° C.

The vinyl alkyl ethers employed in this invention are the lower alkyl ethers containing from 1 to about 10 carbon atoms in the alkyl group R of the following general formula:

$$CH_2=CHOR$$

The preferred vinyl alkyl ethers are those containing from 2 to about 6 carbon atoms in the alkyl radical. Illustrative of the vinyl alkyl ethers found suitable one can mention vinyl methyl ether, vinyl ethyl ether, vinyl propyl ether, vinyl butyl ether, vinyl isobutyl ether, vinyl pentyl ether, vinyl octyl ether, vinyl 2-ethylhexyl ether, vinyl decyl ether, and the like. The vinyl alkyl ether may or may not contain an inhibitor. The presence of an inhibitor for the vinyl alkyl ether has not been found detrimental to the polymerization reaction of this invention.

The free-radical catalysts suitable for use in this invention are air, oxygen, and materials which yield oxygen under the reaction conditions employed, such as the peroxidic compounds. Illustrative of the peroxidic compounds useful in this invention are hydrogen peroxide, t-butylhydroperoxide, persuccinic acid, lauroyl peroxide, butyryl peroxide, acetyl peroxide, benzoyl peroxide, peracetic acid, dipropionyl peroxide, di-tert.-butyl peroxide, the alkali metal persulfates, perborates and percarbonates, diisopropyl peroxydicarbonate, and the like. The concentration of the catalyst can be varied from about 0.001 to about 5 mole percent based on the total weight of the polymerizable monomers charged. The preferred concentration is from about 0.003 to about 1 mole percent; and the preferred catalyst is molecular oxygen at a concentration of from about 50 to about 300 parts per million.

The purity of the ethylene monomer can vary widely, and commercially available ethylene can be used, which varies in purity from about 90 percent to about 99.5 percent ethylene. The other impurities generally found in small amounts in ethylene are acetylene, propylene, butylene, ethane, propane, and other hydrocarbons. In most instances these impurities are present at a total concentration of less than 5 percent by weight.

As previously indicated, the polymerization can be carried out in a batchwise manner or in a continuous manner. The continuous process, however, is preferred; and this process can be conveniently carried out in a jacketed tubular reactor which can vary in length from about 50 feet to about 1000 feet or more and in inside diameter from about ¼ inch to about 1½ inches or more. In the polymerization, the reaction mixture of ethylene, vinyl alkyl ether, and catalyst is continuously passed through the tubular reactor at maintained pressures of from about 15,000 p.s.i. to 40,000 p.s.i. or more and at temperatures of from about 90° C. to about 350° C. The copolymer is intermittently discharged from the tubular reactor into a hot pot, where unreacted ethylene and vinyl alkyl ether are flashed off, and the resin is then extruded into a water bath to be cooled, pelleted, and recovered.

While the copolymers of this invention have unexpectedly superior optical properties, these properties can be further improved by hot-processing the resin. This hot-processing step is optional and involves mixing the above pelleted resin in a Banbury-type mixer for several minutes at about 100° C., or the heated resin mass is rolled on a two-roll mill to a sheet from about ¼ inch to about ½ inch thick, cooled and granulated.

The optical properties which show improvement are haze, gloss, and see-through.

Haze is that percentage of transmitted light which in passing through the film specimen deviates from the incident beam by forward scattering. Measurements are made with a Gardner Pivotable Sphere Hazemeter with an automatic photometric detector. Only light deviating more than 2.5 degrees on the average is considered to be haze. Haze and see-through differ primarily in the angle of scattering; the latter term concerns scattering less than plus or minus 0.07 degree from the incident beam.

The specular gloss value is a relative measure of the surface roughness of thin films. The measurement is more specifically defined as 60° specular gloss which is one thousand times the 60° specular reflectance of a sample measured with apparatus having the illuminating and viewing beams specified by ASTM method D523-53T. The measurements are conducted with a glossmeter head used in conjunction with the hazemeter described above.

Specular transmission or instrumental see-through is defined as the percent total light which after passing through a film sample is deviated less than plus or minus 0.07 degree from the incident beam. Measurements are conducted with an apparatus known as the Texas City Specular Transmission Instrument. Specular transmission, for polyethylene film, is approximately equivalent to AMA see-through distances in the range 5 to 60 feet. The latter method is a visual test employing a standard AMA eye chart. Films with good see-through properties generally, but not always, have low haze.

The improvements in the optical properties of the copolymers produced by the process of this invention can be seen from FIGURES I to III. The figures clearly show that the improvements alleged are obtained only when the amount of vinyl alkyl ether present in the polymerization mixture lies within the critical ranges set forth herein.

FIGURE I illustrates the improvements in haze observed on 1.5 mil films. It can be seen that improvement is obtained before and after hot-processing. As shown in this figure, the unprocessed homopolymeric polyethylene film has a haze value of 30 percent. The addition of vinyl alkyl ether to the feed improves the haze value by lowering it, and at about a 2 mole percent concentration of the vinyl alkyl ether the haze value is at its lowest point. Further increase in the concentration of the vinyl alkyl ether in the feed shows a worsening of the haze value and at concentrations of about 4.5 mole percent in the feed, the film shows no improvement over the unmodified polyethylene.

FIGURE II illustrates the improvements in gloss observed on 1.5 mil films. Again it is seen that a vinyl alkyl ether concentration in the feed which falls within the critical range set forth in this application shows an unexpected and desirable increase in the gloss value.

FIGURE III illustrates the improvements in see-through obtained in 1.5 mil films produced from the copolymers of this invention.

The other properties of the copolymers were determined by the following test procedures:

Melt Index—ASTM D-1238-52T.
Density—Hunter & Oaks, Trans. Faraday Soc., 41, 49.
Stiffness—ASTM D-747-48T.
Elongation—A "dog-bone" shaped specimen is cut from a compression molded 75 mil plaque, and stretched on an Instron Tester Model TTB. The difference between the length at break minus the original length divided by the original length and multiplied by 100 is the percent ultimate elongation.
Yield point—Using the same Instron Tester. The load at the yield point, in pounds, is divided by the product of the width, in inches, and the average thickness, in inches, of the sample.
Ultimate tensile strength—Using the same Instron Tester. The breaking load, in pounds, is divided by the product of the width, in inches, and the average thickness, in inches, of the sample.
Vinyl alkyl ether content of resin—Microanalytic procedures for elemental carbon, hydrogen, and oxygen contents.

The following examples further serve to illustrate this invention. For convenience, the properties of the resins are summarized in the table following the examples.

*Example I*

(A) A mixture of ethylene containing 2.1 mole percent of vinyl ethyl ether and about 150 parts per million of oxygen was compressed to about 30,000 p.s.i. The mixture was continuously passed through a jacketed tubular reactor 60 feet long at a rate of about 2500 pounds per hour while maintaining a pressure of about 30,000 p.s.i. in the reactor and a jacket temperature of about 180° C. After passing through the reactor the hot liquid copolymer and unreacted monomers were discharged intermittently through a suitable control valve and quenched with water jets and fed into a vessel where the copolymer was separated and unreacted monomers were recovered for recycling. The ethylene/vinyl ethyl ether copolymer was recovered and then dried.

Film was produced by extruding the polymer at a rate of 5 pounds per hour in a 1 inch extruder equipped with a circular die 2 inches in diameter having a lip separation of 0.020 inch. The temperature was adjusted so that the resin was at 150° C. as it left the die lips. The heat-softened resin was expanded in the shape of a tube and pulled upward by variable speed pinch rolls, the tube having a lay-flat width of six inches. The 0.020 inch thick extruded heat-softened resin was stretched to a minimum thickness of about 0.0007 inch in a span of 3 to 4 inches by the combined action of the pinch rolls and air that was forced inside the tube.

(B) A control run was carried out using the same procedure as described above. The only differences were that the control run did not contain any vinyl alkyl ether in the feed, and the concentration of the oxygen catalyst was 167 parts per million.

The film produced from the copolymer of run A above showed superior extrusion behavior and exhibited reduced shrinkage over the film produced from the homopolymer of run B. The copolymeric film also had greatly improved haze, gloss, and see-through properties over the corresponding properties of the unmodified homopolymer.

*Example II*

The polymerization procedure of Example I was repeated with 1.5 mole percent of vinyl ethyl ether in the feed. The ethylene/vinyl ethyl ether copolymer produced showed an improvement in optical properties but it was not as marked an improvement as was observed in the copolymer of Example I.

In the same manner, the copolymer of ethylene and vinyl 2-ethylhexyl ether is produced.

*Example III*

The polymerization procedure of Example I was repeated with 4.5 mole percent of vinyl ethyl ether in the feed. The ethylene/vinyl ethyl ether copolymer produced showed only a negligible improvement in optical properties over the unmodified homopolymeric polyethylene.

*Example IV*

The polymerization procedure of Example I was repeated in a tubular reactor about 500 feet long with 1.8 mole percent of vinyl ethyl ether in the feed. After passing through the reactor, the hot liquid copolymer and unreacted monomers were discharged intermittently through a suitable control valve into a heated separating vessel where the copolymer was separated, and unreacted monomers were recovered for recycling. The ethylene/vinyl ethyl ether copolymer was recovered by extruding the melt into a pelleter; and film was prepared from the copolymer as in Example I. The film produced showed improved optical properties over unmodified polyethylene, as well as improvements in other physical properties.

*Example V*

The polymerization procedure of Example I was repeated but using 0.92 mole percent of vinyl isobutyl ether in the feed. The ethylene/vinyl isobutyl ether copolymer produced showed improved optical properties in comparison to the properties of the homopolymeric polyethylene.

*Example VI*

The procedure of Example I was repeated but using 1.8 mole percent of vinyl isobutyl ether in the feed. All of the film properties were markedly improved over the properties of homopolymeric polyethylene, and were better than the properties of the film produced from the copolymer of Example V.

| Example | IA | IB | II | III | IV | V | VI |
|---|---|---|---|---|---|---|---|
| Mole percent ether in feed | 2.1 | 0 | 1.5 | 4.5 | 1.8 | 0.92 | 1.8 |
| Catalyst, p.p.m. $O_2$ | 151 | 167 | 162 | 178 | 76 | 151 | 49 |
| Conversion | 20.6 | 23.1 | 21.8 | 17.0 | 11.8 | 23.6 | 18.1 |
| Mole percent ether in resin | 0.9 | 0 | 0.7 | 1.8 | 2.6 | 0.9 | 1.3 |
| Melt index, d.g.m./min | 10.5 | 1.4 | 2.1 | 4.7 | 3.7 | 5.0 | 4.0 |
| Density, g./cc. at 23° C | 0.9184 | 0.9250 | 0.9255 | 0.9283 | 0.9244 | 0.9219 | 0.9266 |
| Stiffness, p.s.i.$\times 10^{-3}$ | 20 | 16 | 21 | 29 | 25 | 21 | 27 |
| Yield point, p.s.i. | 1,480 | 1,260 | 1,490 | 1,600 | 1,480 | 1,360 | 1,590 |
| Ultimate tensile strength, p.s.i. | 1,250 | 1,370 | 1,910 | 1,520 | 2,000 | 1,560 | 1,930 |
| Elongation, percent | 140 | 590 | 800 | 560 | 880 | 580 | 620 |
| Optical Properties: | | | | | | | |
| Before hot-processing— | | | | | | | |
| Haze, percent | 17 | 35 | 18 | 28 | 9.7 | 20.3 | 9.2 |
| Gloss | 60 | 34 | 57 | 41 | 84 | 53 | 96 |
| See-through, percent | 3 | 1 | 3 | 1 | 3 | 1.6 | 14 |
| After hot-processing— | | | | | | | |
| Haze, percent | .5 | 26 | 12 | 15 | 3.7 | 10.4 | 6.7 |
| Gloss | 145 | 43 | 82 | 67 | 138 | 85.5 | 116 |
| See-through, percent | 46 | 1 | 25 | 5 | 50 | 18 | 33 |

What is claimed is:

A process for producing solid copolymers of ethylene and vinyl ethyl ether having improved optical properties, which comprises copolymerizing a mixture of ethylene and vinyl ethyl ether at a temperature of from about 90° C. to about 350° C. under a pressure of at least 15,000 p.s.i. in the presence of from about 0.001 to about 5 mole percent, based on the total amount of polymerizable monomers charged of oxygen as the catalyst; the concentration of vinyl ethyl ether in the mixture being from about 1 to 3.5 moles per 100 moles of ethylene.

References Cited by the Examiner
UNITED STATES PATENTS

| | | | |
|---|---|---|---|
| 2,388,178 | 10/1945 | Peterson | 260—88.1 |
| 2,650,913 | 9/1953 | Boyd | 260—88.1 |
| 2,920,067 | 1/1960 | Mortimer | 260—88.1 |
| 2,956,995 | 10/1960 | Knight | 260—88.1 |
| 3,026,290 | 3/1962 | Gluesenkamp | 260—88.1 |
| 3,033,840 | 5/1962 | Strauss | 260—88.1 |

JOSEPH L. SCHOFER, *Primary Examiner.*

PHILIP E. MANGAN, H. N. BURSTEIN, WILLIAM H. SHORT, *Examiners.*